United States Patent
Tamm

(10) Patent No.: US 9,977,727 B2
(45) Date of Patent: *May 22, 2018

(54) METHODS AND SYSTEMS FOR INTERNALLY DEBUGGING CODE IN AN ON-DEMAND SERVICE ENVIRONMENT

(71) Applicant: salesforce.com, inc., San Francisco, CA (US)

(72) Inventor: Steven Tamm, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/263,237

(22) Filed: Sep. 12, 2016

(65) Prior Publication Data
US 2016/0378641 A1 Dec. 29, 2016

Related U.S. Application Data

(63) Continuation of application No. 14/636,997, filed on Mar. 3, 2015, now Pat. No. 9,465,720, which is a continuation of application No. 13/085,316, filed on Apr. 12, 2011, now Pat. No. 8,972,953.

(60) Provisional application No. 61/324,958, filed on Apr. 16, 2010.

(51) Int. Cl.
*G06F 9/44* (2018.01)
*G06F 11/36* (2006.01)
*H04L 29/08* (2006.01)

(52) U.S. Cl.
CPC ........... *G06F 11/3644* (2013.01); *G06F 8/70* (2013.01); *G06F 11/3656* (2013.01); *H04L 67/10* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,781,778 A | 7/1998 | Meier et al. |

(Continued)

OTHER PUBLICATIONS

Non-Final Office Action for U.S. Appl. No. 13/085,315 dated Jul. 17, 2013, 24 pages.

(Continued)

*Primary Examiner* — Daxin Wu
(74) *Attorney, Agent, or Firm* — Jaffery, Watson, Mendonsa & Hamilton LLC

(57) ABSTRACT

A remote debug session for a server group is provided. A server group including multiple servers that perform workload sharing receives a request to debug code executed at the server group. The code is executed on behalf of a client of a database associated with the server group. At least one of the servers of the group initiates a debugging session and establishes a communication connection with the client. The server group maintains the connection open with the client for the duration of the debugging session. Subsequent requests related to the debug session can be handled in a number of ways by the server group, and all communication to the client about processing the requests is through the connection.

19 Claims, 7 Drawing Sheets

(56) References Cited

U.S. PATENT DOCUMENTS

| | | | |
|---|---|---|---|
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,042,614 A * | 3/2000 | Davidson | G06F 11/362 714/E11.21 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,683 B1 * | 11/2001 | Fuh | G06F 11/362 714/E11.21 |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,444,552 B2 * | 10/2008 | Kilian | G06F 11/362 714/4.4 |
| 7,620,655 B2 | 11/2009 | Larsson et al. | |
| 8,171,346 B2 | 5/2012 | Stairs et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0087950 A1 * | 7/2002 | Brodeur | G06F 11/3636 717/124 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2007/0240217 A1 * | 10/2007 | Tuvell | G06F 21/56 726/24 |
| 2008/0281610 A1 * | 11/2008 | Yoshida | G06Q 30/02 705/1.1 |
| 2009/0172630 A1 * | 7/2009 | Wang | G06F 9/30145 716/104 |
| 2009/0177744 A1 | 7/2009 | Marlow et al. | |
| 2009/0271472 A1 | 10/2009 | Scheifler et al. | |
| 2010/0057865 A1 | 3/2010 | Chan et al. | |
| 2011/0214023 A1 * | 9/2011 | Barlow | G06F 11/364 714/46 |
| 2011/0307871 A1 | 12/2011 | Branda et al. | |

OTHER PUBLICATIONS

Final Office Action for U.S. Appl. No. 13/085,316 dated Jan. 6, 2014, 23 pages.

Non-Final Office Action for U.S. Appl. No. 13/085,316 dated Jun. 20, 2014, 8 pages.

Notice of Allowance for U.S. Appl. No. 13/085,316 dated Jun. 20, 2014, 8 pages.

Non-Final Office Action for U.S. Appl. No. 14/636,997 dated Sep. 22, 2015, 21 pages.

Final Office Action for U.S. Appl. No. 14/636,997, dated Mar. 21, 2016, 24 pages.

Notice of Allowance for U.S. Appl. No. 14/636,997 dated Jun. 15, 2016, 9 pages.

* cited by examiner

METHODS AND SYSTEMS FOR INTERNALLY DEBUGGING CODE IN AN ON-DEMAND SERVICE ENVIRONMENT

CLAIM OF PRIORITY

This continuation patent application claims the benefit of priority of U.S. patent application Ser. No. 14/636,997, filed Mar. 3, 2015, now U.S. Pat. No. 9,465,720, issued Oct. 11, 2016, which is incorporated herein by reference; which is a continuation of and claims the benefit of priority of U.S. patent application Ser. No. 13/085,316, filed Apr. 12, 2011, now U.S. Pat. No. 8,972,953, issued Mar. 3, 2015, which is incorporated herein by reference; and further claims the benefit of priority of U.S. Provisional Patent Application No. 61/324,958, filed Apr. 16, 2010, which is incorporated herein by reference.

FIELD

Embodiments of the invention are related generally to database management, and embodiments of the invention are more particularly related to deleting large amounts of data from a multitenant database.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2011, salesforce.com, inc., All Rights Reserved.

BACKGROUND

In many conventional database systems, users access their data resources in one logical database, from a user's own systems. Remote access to a database includes accessing the database over a network, and consumes network resources as well as resources of the database system being accessed. If a client has exclusive access to the database, access issues are fairly similar between accessing a local database versus accessing a remote database.

However, access to a remote database shared by multiple users means that resource use by one user prevents those resources being used by another user. If the remote shared database additionally executes code for users, remote debugging can decrease performance of the database. Thus, remote debugging in an environment where a user does not have exclusive control over the user means that one user may use a disproportionate amount of database system resources to perform the debugging. Thus, remote debugging may either be disallowed, or the significant performance degradation may occur. It will be understood that traffic to the database system related to debugging would not appear the same to the system as other traffic. Better system performance is achieved when all traffic can be handled in a standardized way, rather than having different rules and resource use for different kinds of traffic.

Trying to implement breakpoints, code step through, and evaluation further complicates remote debugging due to the traditional exclusivity of execution resources required to implement such debugging techniques. It will be understood that consistency in execution needs to be maintained for breakpoints and code step through to function properly. Also, traditional distributed execution would create inconsistency in evaluation of the debugging process.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
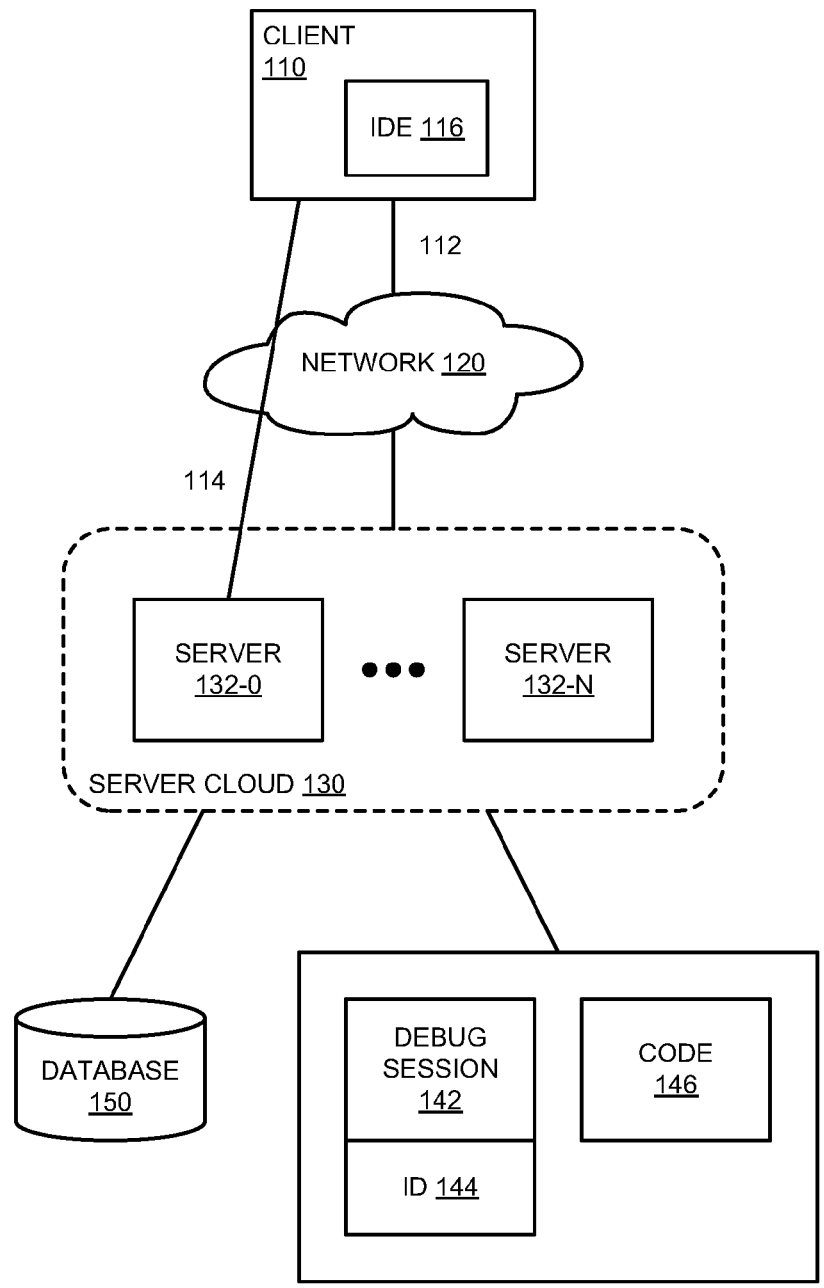
FIG. 1 is a block diagram of an embodiment of an environment that supports remote debugging in a database system.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, remote debugging is provided from a client to a server group. A server group includes multiple servers that perform workload sharing of operations for multiple different clients. The resources of the server group are shared among the multiple clients of a database that stores data for the clients.

The server group receives a request to debug code for the requesting client executed at the server group. One of the servers of the group initiates a debugging session and establishes a communication connection with the client. The one server maintains the connection open with the client for the duration of the debugging session. Subsequent requests related to the debug session can be handled in a number of ways by the server group, and all communication to the client about processing requests related to the debug session is handled through the connection by the one server.

In one embodiment, the database is a multitenant database system (MTS). As referred to herein, a multitenant database stores data for multiple client organizations, which are each identified by a tenant ID. An MTS is a database system with a multitenant database. One or more users can be associated with each tenant ID. The one or more users of each client organization access data identified by the tenant ID associated with the respective client organization. The multitenant database is typically a database stored and hosted remote from the client organization. Typically, the multitenant database is hosted by an entity (e.g., company) separate from the client organization. An MTS as described herein can be said to provide on-demand database services. An MTS is typically a hosted system that provides as much database storage and service as required by each tenant.

It will be understood that because multiple tenants share the database system resources (e.g., processing, network bandwidth, process threads, database connections, memory, storage), if one tenant or client uses a disproportionate of resources for debugging traffic performance may be negatively affected for other clients. As described herein, the open connection and the debug session enable a database system to treat the debugging traffic like any other traffic in the system. Thus, whether requests are received for a specific debugging session, or for other operations within the system, the system is able to handle the operations and distribute work within the server group without having one user tie up resources.

Additionally, the initiating of the debugging session and the establishing of the communication connection allow for a consistent point of communication to the client. Thus, the server group can allow sharing of resources among client and still provide consistency of session experience that is needed for debugging. Thus, from a user-experience perspective, the remote debugging in the remote database environment allows debugging as if the debugging environment were local.

Furthermore, the consistency and the single communication connection enable the use of break points, step through, and evaluation via a remote debugging environment. Thus, a server group can treat debugging traffic like other traffic for purposes of execution, and not have to allocate resources to allow debugging.

FIG. 1 is a block diagram of an embodiment of an environment that supports remote debugging in a database system. Environment 100 allows on-demand database services to client 110 over network 120. Client 110 represents any type of user device or client device, such as any type of computing device (e.g., desktop, laptop, handheld, mobile phones or other mobile devices), through which a user client accesses server cloud (or server group) 130. Network 120 includes any form of network through which the client device of client 110 can access remote server cloud 130. Network 120 includes transmission hardware and lines, processing equipment, and appropriate software systems as is understood in the art.

As described herein, client 110 allows for a user to perform debugging of code 146 that executes on server cloud 130. Code 146 may be an application on data stored in database 150. Thus, code 146 may be "client code" or a client application that is stored locally to server cloud 130, and executed at server cloud 130, remotely from client 110. The client can thus be considered the debugging engine, but with the debugging processes and threads executing on server cloud 130. In one embodiment, client 110 includes IDE (integrated development environment, also referred to as integrated debugging environment or integrated design environment) 116.

Client 110 requests the debugging session over communication link 112, over network 120. Link 112 represents any communication connection over which client 110 would interact with server cloud 130. The connection may include any known login, handshaking, key/credential verification, and/or other process to provide access by client 110 to database 150. Client 110 accesses database 150 via operations by server cloud 130, which receives and processes requests from client 110.

Server cloud 130 represents a pool or a coordinated group of servers, such as application servers. It will be understood multiple application servers can execute on the same server hardware. There may be multiple physical server hardware elements, and multiple application servers implemented on the hardware. Servers 132-0 through 132-N represent the servers that receive and process requests from client 110, where N is any integer number. Servers 132-0, . . . , 132-N perform workload sharing, where operations are distributed among the servers for execution. Distribution of workload can be managed by a scheduler (not explicitly shown), and/or one of the servers may act as a master that distributes work. There may be queues for each server where operations are distributed, or a common queue that is accessed in a shared fashion (e.g., when a server completes a task it takes the next operation from the queue).

In one embodiment, servers 132-0, . . . , 132-N represent a number of Apex processes or instances, each considered a server for purposes of debugging. A request for debugging is provided to server cloud 130, and one of the servers processes the request from client 110. The server may be randomly assigned (e.g., whichever server is randomly assigned the request as a task). Alternatively, there may be a single server designated for receiving such requests. The processing server registers a debugging session (e.g., for the user or for the client device). The debugging session is assigned an identifier (ID). One of the servers of the group establishes communication connection 114 with client 110, which will be maintained open for the duration of the debugging session to send communication to the client regarding the operations of the debugging session.

In one embodiment, the ID of the debugging session is associated with the server that establishes and maintains connection 114. The server may be the registering server, or another server, depending on the implementation of server cloud 130. Any of servers 132-0, . . . , 132-N may perform operations related to the debugging session, and then direct communication related to the debugging session back to the server associated with the debugging session ID, which is the server that maintains connection 114 with client 110. Thus, all debugging requests can be received and processed just like any other traffic received by the database system (i.e., database 150 and any servers associated with it).

In one embodiment, a separate debugging stack is created with an associated debugging thread started when the debugging session was initiated. The thread (and its associated stack) could be associated with the debugging session ID, and all state information could be persisted on the stack. Thus, any server that performs an operation related to the debugging session could access state related to the debugging session. Alternatively, the state information could be maintained in a mem cache shared among the servers. Debug session 142 represents the debug or debugging session referred to above. Debug session 142 is registered and assigned ID 144.

Database 150 includes hardware storage resources, and software components that execute on processing resources to enable access to the data. A database may be considered a structured approach to storing and accessing data stored in storage resources (such as implementing a relational model, object oriented model, or an object-relational model for data storage). There are many different implementations of a database, and the specific implementation is not relevant to the discussion herein. The database system includes the storage and processing resources, including interface hardware and software (such as physical network connections, network protocol stacks, security elements, and other components for interfacing with the stored data).

Communication connection 114 can be considered a "projected" server socket in the sense that one server (for example, server 132-0) establishes and maintains connection 114, and any other server 132-1, . . . , 132-N that executes tasks related to debug session 142 sends information back to server 132-0 for communication to client 110.

In one embodiment, in the debugging session context, the server establishing connection 114 with client 110 connects to IDE 116 of client 110, rather than having the client establish the connection to request status. The server can then run an agent that exposes a port and allows the IDE to connect to the exposed port. The server then maintains the connection open until debug session 142 is closed. While other types of connections may be used, the use of a socket-based connection allows layering the connection over HTTP (hypertext transfer protocol).

While specific reference is made above to FIG. 1, in general, embodiments of the invention relate to remote debugging from a server group environment that executes the code to be debugged by a remote client.

The server group registers a session, which indicates debugging is requested for a particular user. In one embodiment, one of the servers is designated as a "hold open" server, which holds open a connection back to the client device, and more particularly, to an IDE of the client device. In one embodiment, the "hold open" server executes a communication thread to maintain the communication connection.

With the communication connection maintained, any one of the servers can perform actions related to debugging, and the results of the operations are sent back to the "hold open" server that controls the communication connection. Thus, any request from a user is funneled back to the "hold open" server for communication back to the client device or the user. The "hold open" server may be considered a focal server. In one embodiment, it is the server that handles the original request from the client device. In one embodiment, whenever debugging code is executed (e.g., whenever Apex execution starts), the executing server will look for the registered user, and if the user is found, the executing server will connect back to the "hold open" server, which may also be the registering server, which then communicates back to the client.

For any server to be able to perform the debugging operations, debugging state should be shared among the server group. In one embodiment, the shared state is stored in mem cache. Other implementations could be used where information does not need to be shared because specific server assignments are made. For example, there could be a pool of servers dedicated to maintaining IDE connections, and they could implement an IDE connection stack.

In one embodiment, communication between the client and the server group related to debugging is encrypted. For example, SSL could be used to secure the communication. In one embodiment, the server or servers maintaining the communication connection can provide a unique ID back to the client to identify the communication (e.g., similar to a session ID, but only for communication—in fact, it could be used in addition to a session ID).

In one embodiment, the debugging protocol (e.g., DBGp) has a way to define breakpoints. The breakpoint operations are modified in that a breakpoint can be registered in the same state as the communication connection, and be connected back to the server or servers maintaining the communication connection. In one embodiment, when debug execution pauses, a timeout mechanism starts. If a timeout occurs, it may disable all breakpoints and finish the debug operations to prevent a hung process.

In one embodiment, a database system that supports remote debugging as described herein can be created by employing Eclipse IDE, Eclipse Dynamic Language Toolkit (DLTK), and Apex Events. It will be understood that other languages and conventions could also be used. Referring to the example given, an Eclipse IDE can be implemented with a plugin that support and displays Apex. The DLTK is a tool that provides extensible frameworks designed to reduce the complexity of building full featured development environments for dynamic languages (e.g., PHP and Perl), or development environments for other languages (e.g., Ruby, Javascript, Python). The DLTK's debugging is based on XDebug's DBGP (debugging protocol—usually referred to as DBGp protocol or DBGP protocol). The protocol is a standard socket based mechanism for a debugging engine (e.g., Apex) to interact with an IDE (integrated development environment, such as Eclipse) in a relatively language-neutral fashion.

Apex Events provides event support, provides a mechanism for hooking and running Apex code with an external process in a generic manner, and is part of a generic debugger and logging framework for Apex. It will be understood that all trademarks use here and elsewhere are meant only to identify exemplary elements currently known; all trademarks are the property of their respective owners.

In one embodiment, creation of a debugging session includes creating a main thread that remains open for the life of an application server, or one of the servers of the server group. The main thread may be considered a "fake" thread in that it may not have any work to perform. However, it can maintain the session in the server and not get closed at the conclusion of a set of threads. Operation of a debugger often involves closing a debugging launch after completing all threads. In the case where different application servers may execute different operations, the session may need to be kept open for longer than the execution of certain operations associated with the debugging session.

In one embodiment, the remote debugging environment as described herein includes the execution of two threads, one to execute the debugger, and one to maintain communication with the client device. In an embodiment where an Apex debugging thread is used, there may be one Java thread to execute Apex (an Apex thread), and another Java thread to provide communication to the client device (an IDE thread). Thus, for example, the client can send a pause command via the communication channel, and the IDE thread signals the Apex thread to stop on the next statement and pause while the IDE thread performs its operations.

In one embodiment, three mechanisms are used to coordinate between the Apex and IDE threads and to enable the IDE thread to perform its operations while the Apex thread is paused. A first mechanism indicates what happens on startup or initialization of the Apex thread. Namely, on startup the Apex thread connects to the client device, and awaits a command to begin stepping into the debugging. A second mechanism includes a stack manager, which may have a method called by every Apex statement. The stack manager maintains block variables in scope, or variables related to a lock between the Apex and IDE threads. The stack manager may turn on a suspend to block the Apex thread and stay in a loop awaiting the IDE thread to continue. The stack manager may attempt to regain a lock every predetermined time period (e.g., every three seconds) when a suspend lock is turned on, and if it cannot do so after a longer predetermined time period (e.g., five minutes), it will assume the communication thread is not functioning properly. If the suspend lock is not turned on, the stack manager may check to determine if there is a breakpoint. If there is a breakpoint, it pauses the Apex thread and sends a break to the IDE thread, and then waits as above.

In another embodiment, other protocols or debugging engines may be used, in which case the Apex thread may be more generically referred to as a debugging or debug thread, and the IDE thread may be either an IDE thread or a client communication thread.

In one embodiment, most other commands related to the debug environment operate while the Apex thread is suspended. For example, context variable commands (stack_get, context_get, property_get) use the stack manager and a container associated with the stack manager to return the appropriate information, and an evaluation command re-parses an expression in the context of the current statement's container and returns the result. In one embodiment of a database system, there may be a single thread to a request, which would mean that before the above commands are executed, the state of the debug thread should be copied over into the IDE thread's context.

Figure 2:
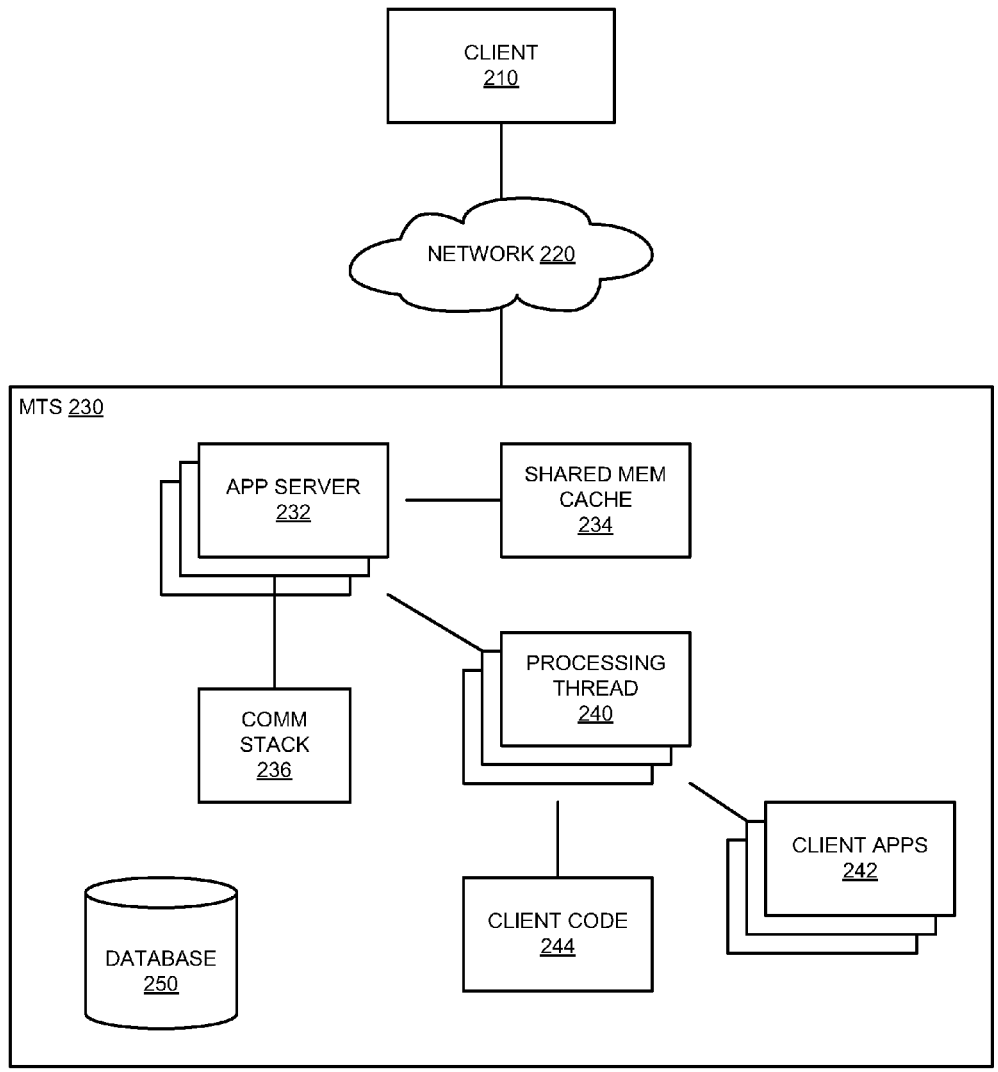
FIG. 2 is a block diagram of an embodiment of a remote debugging environment in a server group.

FIG. 2 is a block diagram of an embodiment of a remote debugging environment in a server group. Environment 200 could be an example of an environment according to environment 100 discussed above. Environment 200 includes an on-demand database services environment with multitenant database system 230, and allows remote debugging according to any embodiment described herein. Client 210 is a client device according to any type of client device described herein. Network 220 is a network according to any embodiment described herein. Client 210 sends remote debugging requests over network 220 to MTS 230, and a server of MTS 230 establishes a debugging communication connection to client 210 over network 220.

MTS 230 is a multitenant database system, with multitenant database 250, and a group of application (app) servers 232. Database 250 provides stores data for multiple client organizations each identified by a tenant ID and one or more users are associated with the tenant ID. The client device or a user associated with the client device is one of the users associated with the tenant ID. In MTS 230, the one or more users of each client or tenant organization access data identified by the tenant ID associated with the respective client organization, but generally do not access data associated with other tenant IDs. Database 250 is remote from client 210 in that it is hosted by an entity or organization separate from the client organization associated with client 210. Application server group 232 provides processing services for access to the database 250.

Application server group 232 has associated communication stack 236, which supports the communication connection back to client 210 that remains open for the duration of a debug session. In one embodiment, application server group 232 has associated shared mem cache 234, which is a mem cache as understood by those skilled in the art. Shared mem cache 234 provides a mechanism for servers that perform workload sharing to share state of various processes.

Processing threads 240 represent threads that may be executing on application servers 232. Such threads include processes for client applications 242 and/or other client code 244. When client 210 performs debugging of client applications 242 or other client code 244, debug requests are also received and processed by application servers 232, just as the applications are also executed by the application servers. In one embodiment, a stack manager (not explicitly shown) checks for breakpoints and step-through processes of debugging to handle stepping in and stepping out in a way that is smooth within the MTS.

In one embodiment, application server group 232 generates a new processing thread 240 for each subsequent service request associated with a debug session. Each processing thread can exist for service upon the request, and then be closed. However, with use of shared mem cache 234, or other state sharing mechanism, the state of the debug session can be maintained for all operations executed for the debug session.

In one embodiment, the remote debugging supports the use of breakpoints. A server of group 232 that is processing a request related to a breakpoint can set a breakpoint that is associated with whatever processing thread is related to operations that will be interrupted for purposes of debugging. Thus, a breakpoint can be set to interrupt only execution of a thread of a server handling execution of the debugging session, without interrupting execution of other processing threads 240. So one processing thread can be interrupted but not tie up resources of the system. In one embodiment, the breakpoint is associated with a timeout that can be set when the breakpoint is set. Execution of the thread can be resumed without additional breakpoints if the timeout occurs (i.e., the full length of the timeout period expires). This can prevent hung threads in MTS 230.

Figure 3A:
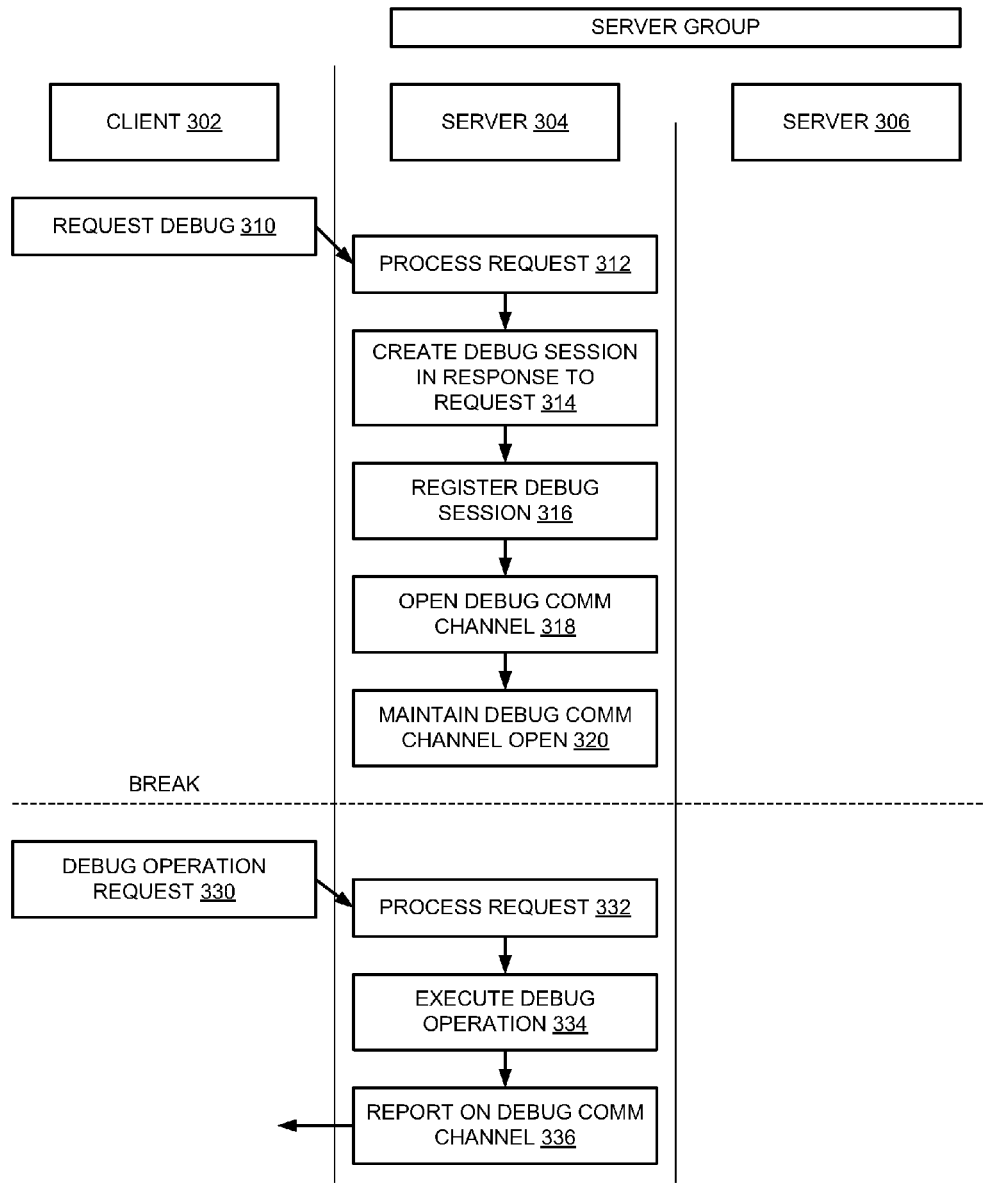
FIGS. 3A and 3B represent flow diagrams of embodiments of execution of a remote debugging process.
Figure 3B:
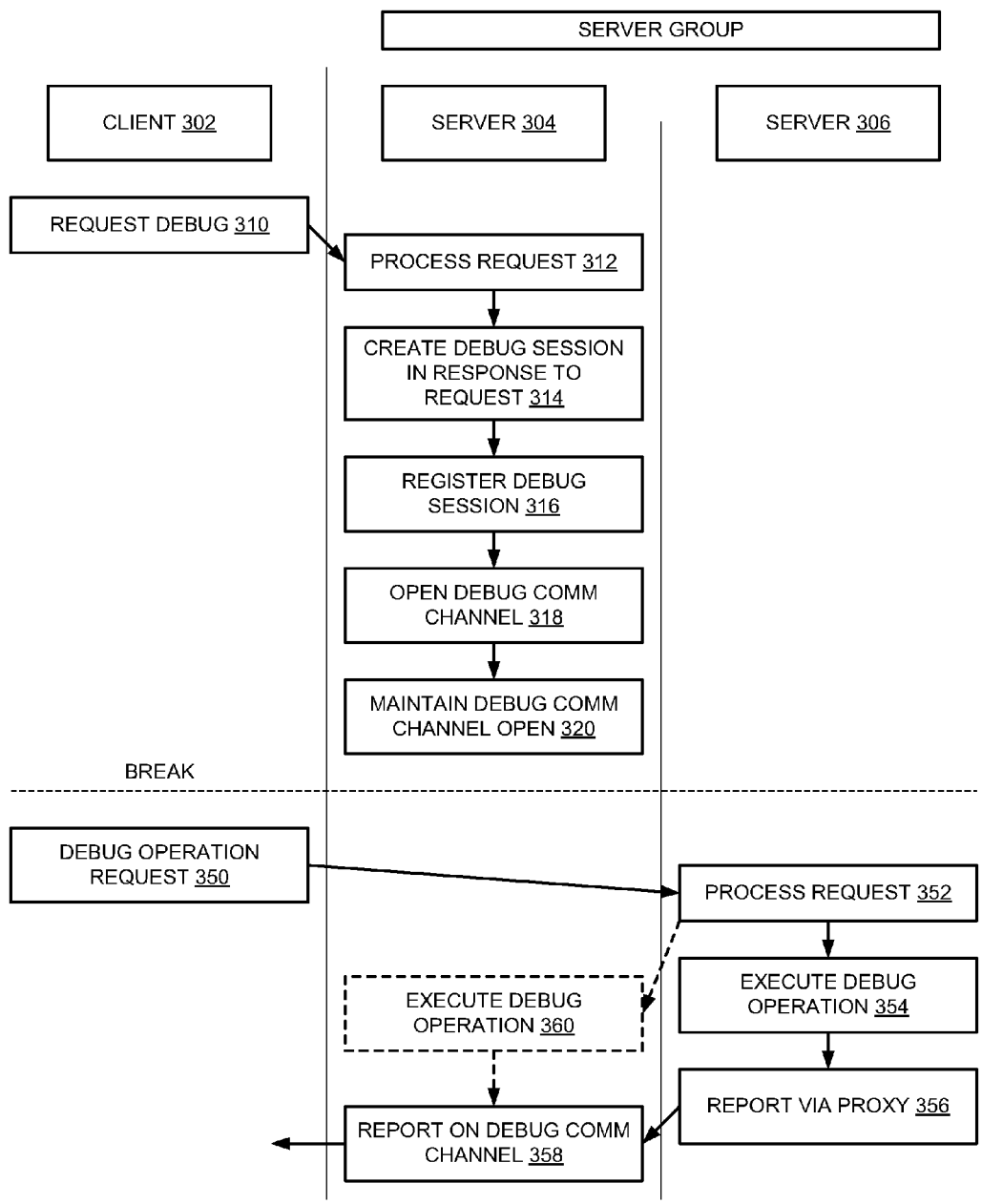

FIGS. 3A and 3B represent flow diagrams of embodiments of execution of a remote debugging process. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

In a swim-lane flow diagram as illustrated, the flow is further understood by reference to the component that performs the operation. In the embodiment of FIG. 3A, client 302 sends a request for remote debugging to a server group that includes servers 304 and 306. Other servers may also exist. In this embodiment, server 304 receives and processes an initial debug request from client 302, and also processes later requests associated with the debug session. For example, server 304 could be a server dedicated out of the server group to process debug requests. The server could be dedicated by predetermination, or configuration of the server group, and/or could be designated because it randomly receives the initial request by client 302.

In the embodiment of FIG. 3B, server 304 processes an initial request, establishes a communication connection, and server 306 performs operations related to a later request. An additional alternative not shown is that server 304 may process the original request and then some other server of the group could establish the communication connection to client 302. Other alternatives will also be understood by the skilled reader related to variations of one server processing an initial request, and either that server or another server handling later requests.

Referring again to FIG. 3A, client 302 requests debug of code executed by the server group, 310. Server 304 processes the request, 312, either by designation, or by random assignment. Server 304 creates a debug session in response to the request, 314. Server 304 registers a debug session, 316. Server 304 then opens a debug communication channel with client 302 for all communication related to the debug session, 318. Server 304 maintains the debug communication channel open with the client for the duration of the register debug session, 320.

The break represents any duration of time that may transpire between the initial request by client 302 to any subsequent request related to the same debug session. The subsequent request is sent by client 302 as a request for a debug operation, 330. In one embodiment, server 304 processes the request, 332, either by system configuration, or by random assignment. Server 304 executes the requested debug operation, 334, and then needs to communicate the results of the operation back to client 302. Server 304 initially established the debug communication channel with client 302, and thus can simply report on the debug communication channel, 336.

Referring to FIG. 3B, the same debug request 310, and request processing including establishing a debug communication channel are performed as before with FIG. 3A. Again, there is a break, which could be any amount of time. In one embodiment, the break is simply the completion of the initial processing of the request, and additional debug operations are already pending in the server group.

In the specific embodiment illustrated, subsequent debug operation request is sent to the server group, 350, which is processed, 352, by server 306. In one embodiment, server 306 executes the debug operation, 354. In an alternate embodiment, the debug operation is sent to another server (either server 304, or another server not shown) for execution, 360. If server 304 performs the requested debug operation, it will again simply report on the debug communication channel it maintains open with the client, 358. If any server other than server 304 executes the subsequently requested debug operation, that server (e.g., server 306 as shown) reports via proxy, 356. Reporting via proxy means that communication is provided to server 304 (the server that holds open the debug communication channel) to communicate back to client 302.

Figure 4:
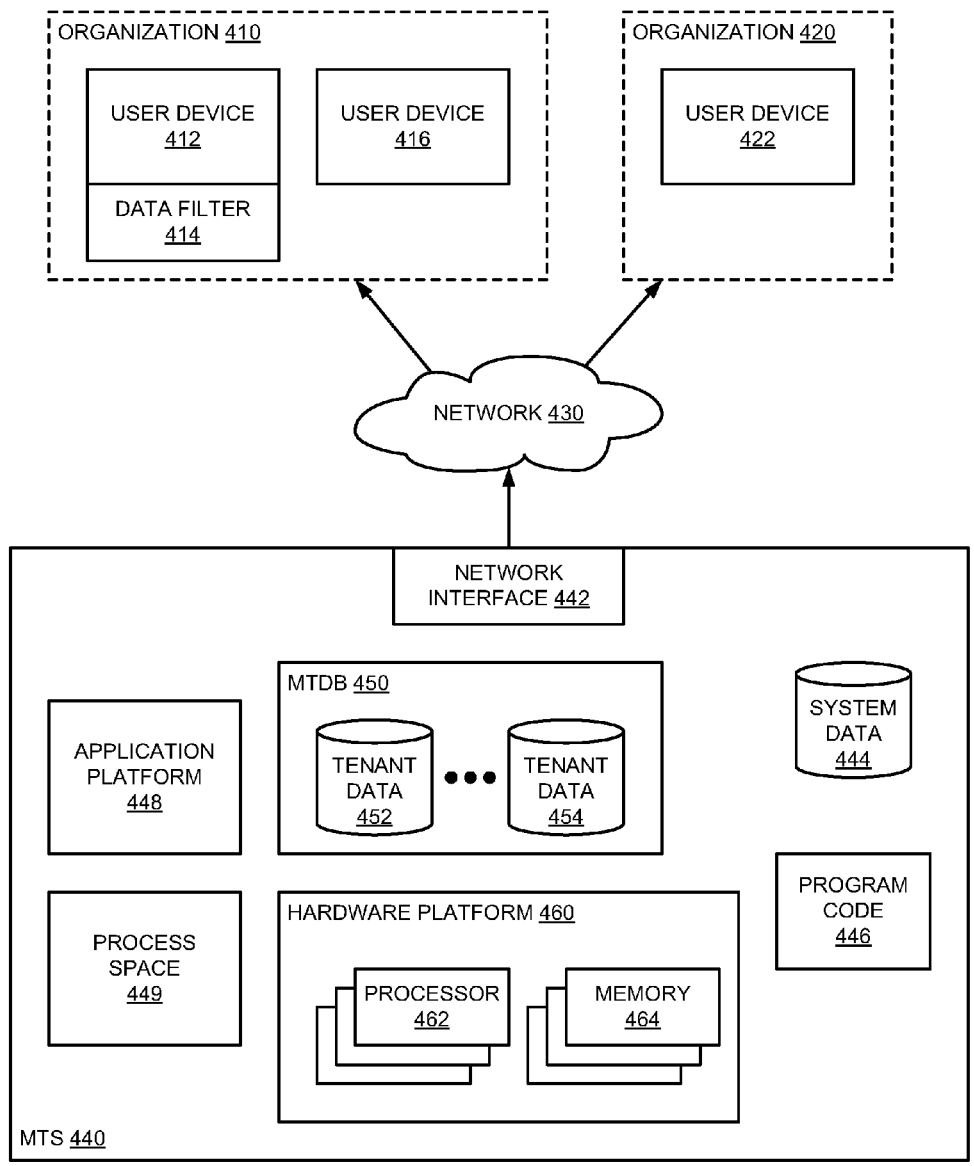
FIG. 4 is a block diagram of an embodiment of an environment for on-demand database services.

FIG. 4 is a block diagram of an embodiment of an environment for on-demand database services. Environment 400 includes components related to an on-demand database service. Environment 400 includes multitenant database system (MTS) 440 and one or more organizations 410 and 420, which are tenants of the MTS. Each organization can include one or more users and/or user devices.

MTS 440 provides on-demand database services for environment 400. An on-demand database service, such as provided by MTS 440, is a database system that is made available to an outside user as needed by the user (e.g., on the demand of the user). Thus, a user does not necessarily need to be concerned with building and/or maintaining the database system, and rather can simply store and access data as needed from a remotely operated database system.

In one embodiment, MTS 440 stores information from one or more tenants into tables of a common database image or multitenant database (MTDB) 450. Accordingly, MTS 440 provides on-demand database service. A database image may include one or more database objects. A multitenant database stores data for various different tenants or organizations in a single database instance. Resources (such as memory, processing space, processing hardware, and other resources of the database system) are shared or allocated among the different tenants.

Multitenant database 450 includes tenant data 452, . . . , 454. The tenant data may be divided into different storage areas, which can be a physical and/or a logical arrangement of data. In one embodiment, multitenant database 450 is accessed via a relational database management system (RDBMS) or the equivalent, which executes storage and retrieval of information against the database object(s). In one embodiment, multitenant database 450 is accessed via an object-oriented database management system (OODBMS) or the equivalent. In one embodiment, multitenant database 450 is accessed via an object-relational database management system (ORDBMS) or the equivalent. It will be understood that an RDBMS manages data stored in the database based on a relational model, where data and data relationships are stored in tables. An OODBMS includes at least some integration of a database with an object-oriented programming language, and data is stored in the database in the same mode of representation as is provided in the programming language. An ORDBMS implements both a relational model and an object-oriented model, storing data in tables, and allowing representation of data consistent with a programming language.

Application platform 448 represents a framework that allows applications of MTS 440 to execute. Thus, application platform 448 includes the software components (such as an operating system) to allow execution of the applications. Hardware platform 460 provides hardware resources to enable the applications to execute on application platform 448, as well as enabling execution of management or control logic for MTS 440. In one embodiment, application platform 448 of MTS 440 enables creation, managing, and executing one or more applications developed by the provider of the on-demand database service, users accessing the on-demand database service via network 430, or third party application developers accessing the on-demand database service via network 430.

MTS 440 represents any type of system that may provide on-demand database service. In addition to application platform 448 and hardware platform 460, which includes processor resources 462 and memory resources 464, MTS 440 may include other components. MTS 440 includes network interface 442 to enable user devices to access MTS 440 over network 430. In one embodiment, MTS 440 includes system data 444, program code 446, and process space 449. System data 444 represents data specific to the running of MTS 440, rather than being tenant data. It is logically separated from the tenant storage, and may be physically separated (e.g., by designating storage areas or address ranges for system data). Program code 446 represents code to implement various functions of MTS 440, which enable the system to provide on-demand database service. Process space 449 represents a framework for executing MTS processes and tenant-specific processes, such as running applications as part of an application hosting service. Additional processes that may execute on MTS 440 include database indexing processes. It will be understood that MTS 440 may include more or fewer components than what is illustrated.

As mentioned above, environment 400 includes organizations 410 and 420, which represent tenants of MTS 440. Each organization may include one or more individual, and may be an individual or small company, up to a large corporation or organization. Thus, it will be understood that the number of user devices associated with each organization could potentially be hundreds or even thousands. Each organization is assigned a tenant identifier (ID) within MTS 440. Each tenant ID could have certain associated properties for use, depending on how the organization is configured. User device 422 is associated with organization 420, and access MTS 440 under the tenant ID of organization 420. Similarly, user devices 412 and 416 are associated with organization 410, and access MTS 440 under the tenants ID assigned to organization 410.

User devices 412, 416, and 422 may be any machine or system that is used by a user to access a database user system. For example, any of the user devices can be a handheld computing device, a mobile phone, a laptop computer, a work station, and/or a network of computing devices. Each user device can be provided with an on-demand database service from MTS 440 via network 430.

Within an organization, users may be further given access privileges and/or restrictions, as illustrated by data filter 414. As illustrated, user device 416 may access MTS 440 in accordance with whatever access is available to organization 410, while user device 412 has additional restrictions applied by data filter 414. In one embodiment, data filter 414 may additionally or alternatively provide specific user interface features for user 412 in accessing data from MTS 440.

The users of user devices 412, 416, and 422 may differ in their respective capacities, and the capacity of a particular user device might be entirely determined by permissions (permission levels) for the current user. For example, where a salesperson is using a particular user device to interact with MTS 440, that user device has the capacities assigned to that salesperson. However, an administrator using the same user device may have different capacities assigned to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Such enforcement could occur based on data filter 414, which can filter per device and/or could filter for the entire organization (e.g., a central filter as opposed to distributed filtering).

Network 430 represents any network or combination of networks. A network is generically an interconnection of devices that communicate with each other. Network 430 can be or include any combination of a LAN (local area network), WAN (wide area network), telephone network, wireless network, point-to-point network, star network, token ring network, hub network, or other appropriate configuration. TCP/IP (Transfer Control Protocol and Internet Protocol) networks are commonly used, such as the global internetwork of networks often referred to as the "Internet." Reference to specific networks in certain examples herein is meant only to provide examples, and is not limiting.

In one embodiment, user devices 412, 416, 422 (and other user devices not shown) communicate with MTS 440 over network 430 using TCP/IP and, at a higher network level, use other common protocols to communicate, such as HTTP (HyperText Transfer Protocol), FTP (File Transfer Protocol), AFS (Andrew File System—a distributed network filesystem using trusted servers), WAP (Wireless Access Protocol). In an example where HTTP is used, user device 412 might include an HTTP client commonly referred to as a "browser" for sending and receiving HTTP messages to and from an HTTP server at MTS 440 (not specifically shown, but which could be executed on hardware platform 460). Such an HTTP server might be implemented as the sole network interface between MTS 440 and network 430, but other techniques might be used as well or instead. In one embodiment, the interface between MTS 440 and network 430 includes load sharing functionality, such as round-robin HTTP request distributors to balance loads and distribute incoming HTTP requests evenly over a plurality of servers. At least as for the users that are accessing that server, each of the plurality of servers has access to data in MTS 440; however, other alternative configurations may be used instead.

In one embodiment, MTS 440 implements a web-based customer relationship management (CRM) system. For example, in one embodiment, MTS 440 includes application servers configured to implement and execute CRM software applications as well as provide related data, code, forms, webpages and other information to and from user devices (e.g., 412, 416, 422) and to store to and retrieve from a database system related data, objects, and webpage content. With a multitenant system, data for multiple tenants may be stored in the same physical database object; however, tenant data is typically arranged so that data of one tenant is kept logically separate from that of other tenants. The logical separation prevents one tenant from having access to another tenant's data. An express sharing of data among tenants is possible, which removes the logical separation. In one embodiment, MTS 440 implements applications other than or in addition to a CRM application. For example, MTS 440 may provide tenant access to multiple hosted (standard and custom) applications, including a CRM application. User (or third party developer) applications, which may or may not include CRM, may be supported by application platform 448, which manages creation, storage of the applications into one or more database objects and executing of the applications in a virtual machine in process space 449 of MTS 440.

In one embodiment, MTS 440 is configured to provide webpages, forms, applications, data and media content to user (client) device to support the access by user devices as tenants of MTS 440. In one embodiment, MTS 440 provides security mechanisms to keep each tenant's data separate unless the data is shared. More than one MTS may be used. If more than one MTS is used, the multiple systems may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" refers to a computer system, including processing hardware and process space(s), and an associated storage system and database application (e.g., OODBMS, RDBMS, ORDBMS) as is known in the art. It will be understood that "server system" and "server" are often used interchangeably herein. Similarly, a database object described herein can be implemented as single databases, a distributed database, a collection of distributed databases, a database with redundant online or offline backups or other redundancies, and might include a distributed database or storage network and associated processing intelligence or logic.

Figure 5:
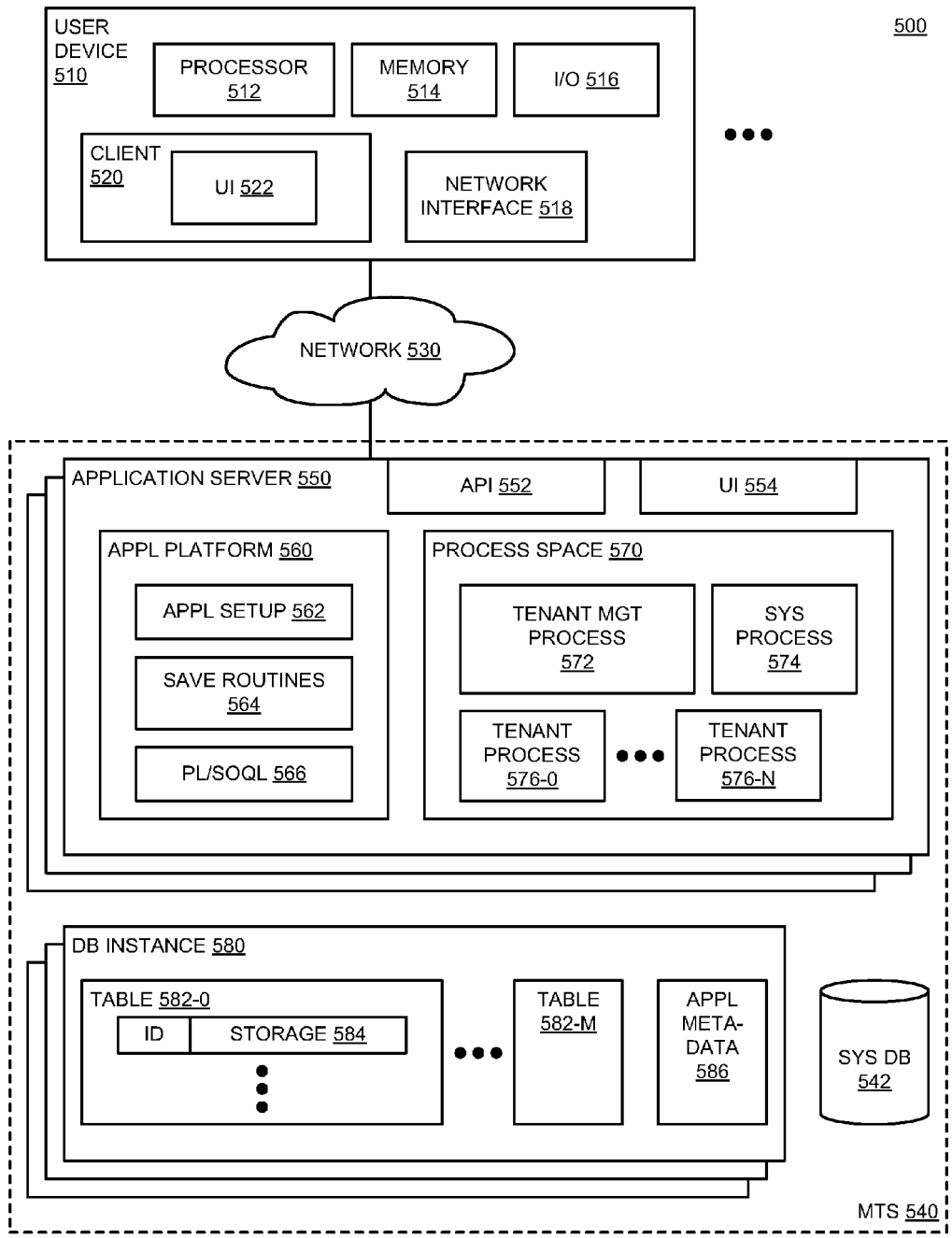
FIG. 5 is a block diagram of an embodiment of an environment for on-demand database services with a multitenant database having multiple data tables.

FIG. 5 is a block diagram of an embodiment of an environment for on-demand database services with a multitenant database having multiple data tables. Environment 500 includes components related to providing an on-demand database service, and may be one example of environment 400 of FIG. 4, with additional components shown. Environment 500 includes one or more multitenant database systems (MTS) 540 and one or more tenants of the MTS, as illustrated by user device 510. User device 510 is generally part of an organization that is the tenant, and user device 510 provides a computing device through which access to MTS 540 is available. MTS 540 provides on-demand database services for environment 500.

Environment 500 may include conventional, well-known elements that are explained only briefly here. For example, user device 510 (and any other user devices through which users access MTS 540) could include a desktop personal computer, workstation, laptop, handheld device, cell phone or smart phone, or any wireless access protocol (WAP) enabled device or any other computing device capable of interfacing directly or indirectly to the Internet or other network connection.

User device 510 includes processor 512, which represents one or more processor devices, and may be any combination of one or more processors. Processor 512 provides hardware means to execute programs and applications on user device 510. Memory 514 represents a memory system for user device 510, and may be any combination of one or more memory devices, short term, and/or long term memory. I/O (input/output) 516 represents any type of input and output devices such as keyboards, pointers and controllers, touchscreens, buttons, microphones, or other input mechanisms, and monitors, screens, printers, interfaces to networks, and/ or other output devices.

User device 510 includes network interface 518, which represents hardware interconnections and control logic and circuitry to enable user device 510 to connect to network 530. Network interface 518 also has associated drivers and possibly other software components to allow user programs to interface with the interconnection hardware. User device 510 includes client 520, which represents a program that allows a user of user device 510 to access information from network 530, such as accessing MTS 540. UI 522 represents a user interface component of client 520, or a user interface in which information from client 520 is presented on user device 520. Thus, UI 522 may be integrated with client 520, or it may be separate from client 520, but display data related to the execution of client 520. UI 522 is rendered on display or user interface hardware or device, which can be understood to be represented by UI 522.

In one embodiment, user device 510 runs an HTTP client as client 520. An HTTP client may be, for example, a browsing program or a browser, which may include a WAP-enabled browser in the case of a cell phone, PDA or other wireless device. The HTTP client allows a user (e.g., subscriber of MTS 540) of user device 510 to access, process, and view information, pages, and applications available from MTS 540 over network 530, based on permissions and privileges. The user interface device of user device 510 can be used to access data and applications hosted by MTS 540, and to perform searches on stored data, and otherwise allow a user to interact with various GUI (graphical user interface) pages that may be presented to a user.

Similar to what is discussed above with reference to network 430 of environment 400, network 530 represents any network or group of networks over which access can be provided to MTS 540. Network 530 may include switching and/or routing elements, cables, connectors, and other components. In one embodiment, at least part of network 530 is the Internet, referring to a specific global internetwork of networks. However, it should be understood that other networks can be used in addition to or instead of the Internet, such as an intranet, an extranet, a virtual private network (VPN), a non-TCP/IP based network, any LAN or WAN or other network.

In one embodiment, user devices such as user device 510 (which may be client systems) communicate with application server 550 to request and update system-level and tenant-level data from MTS 540 that may require sending one or more queries to tenant data storage in database instance 580 and/or system data in system database 542. In one embodiment, MTS 540 (e.g., application server 550) automatically generates one or more SQL statements (e.g., one or more SQL queries) designed to access the desired information. System data storage in system database 542 may generate query plans to access the requested data from database instance 580.

In one embodiment, MTS 540 includes one or more application servers 550. From one perspective, application server 550 can be considered a network interface of MTS 540 to connect to network 530. Application server 550 exchanges (i.e., receives and/or transmits) data with network 530, such as receiving requests and sending replies or sending data. Application servers 550 may share hardware resources for interfacing with network 530, or they may be assigned separate resources. In one embodiment, one or more of application servers 550 can be implemented as an HTTP application server.

In one embodiment, each application server 550 is configured to handle requests for any user associated with any organization that is a tenant. Thus, a request from user device 510 could be received and processed at any application server 550. There may be advantages to avoiding affinity for a user and/or an organization or tenant to a specific application server 550, such as the ability to add and remove application servers from a server pool at any time for any reason, as well as for workload balancing among the servers. In an implementation where user and/or tenant affinity is used, an application server could not be removed without completing its jobs and/or handing off users to another server.

In one embodiment, an interface system implementing a load balancing function (e.g., an F5 Big-IP load balancer) is communicably coupled between application servers 550 and the user devices to distribute requests to the application servers 550. In one embodiment, the load balancer uses a least connections algorithm to route user requests to the application servers 550. Other examples of load balancing algorithms, such as round robin and observed response time, also can be used. For example, in certain embodiments, three consecutive requests from the same user could hit three different application servers 550, and three requests from different users could hit the same application server 550. In this manner, MTS 540 is multitenant, wherein MTS 540 handles storage of, and access to, different objects, data, and applications across disparate users and organizations. In one embodiment, Each application server 550 includes elements to provide database access service and request processing. Application server 550 includes API (application programming interface) 552 and UI 554. UI 554 represents server-side components that provide user interface elements that are provided to user device 510 for display. API 552 provides an interface for users and/or developers to access resident processes of MTS 540.

In one embodiment, application server 550 includes application (appl) platform 560, which provides a sub-environment on which applications hosted by application server 550 can be executed. Application platform 560 may include an operating system or other control logic, as well as business logic and common routines for use by the applications. As illustrated, application platform 560 includes application setup mechanism 562 that supports creation and management of applications, including configuration, by application developers, which may be saved as metadata into tenant data storage of database (db) instance 580. Save routines 564 represent the mechanisms used to store data in database instance 580, such as storing the application setup metadata. Such applications can be executed by subscriber users, for example, in process space 570.

In one embodiment, invocations to or related to such applications may be coded using PL/SOQL (Procedural Language Salesforce Object Query Language) that provides a programming language style interface extension to API 552. Thus, PL/SOQL 566 is capable of serving as a procedural extension to an on-demand database centric service API that allows flow control and transaction control to execute on a server in conjunction with database APIs (e.g., SOQL, data manipulation language (DML), or others). PL/SOQL 566 can enable the capability to thread together multiple SOQL/DML statements as a single unit of work on the server. PL/SOQL 566 need not necessarily be considered a general purpose programming language, seeing that it may be implemented as heavily data focused, but is not necessarily implemented that way. In one embodiment, PL/SOQL 566 can be used by developers to interlace with an on-demand database system, in contrast to traditional application developers' conventional tools, such as PL/SQL (Structured Query Language) of ORACLE, Inc. of Redwood Shores, Calif., and others.

In one embodiment, PL/SOQL 566 includes variable and expression syntax, block and conditional syntax, loop syntax, object and array notation, pass by reference, and other syntax known to other programming languages. Thus, full control over syntax and the ability to reference dynamic schema elements is provided with a new language and runtime for database services. Where embedded concepts that interface with on-demand database applications are provided, syntax and semantics that are easy to understand and which encourage efficient use of database APIs may also be employed. In one embodiment, PL/SOQL 566 is implemented as a strong typed language with direct (non-quoted) references to schema objects such as Object and Field names (both standard and custom).

More details about PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, now expired, which is incorporated in its entirety.

In one embodiment, invocations to applications may be detected by one or more system processes, which manage retrieving application metadata 586 for the subscriber making the invocation and executing the metadata as an application in a virtual machine. Metadata 586 provides data related to access and/or use of data stored in database instance 580. In one embodiment, metadata is stored in a separate table within database instance 580, and in an alternative embodiment, metadata 586 is stored with other data elements of user storage (such as with user storage 584 of table 582-0.

In one embodiment, application server 550 includes process space 570, which may include tenant process spaces 576-0 through 576-N (for some integer number N of process spaces configured in application server 550), tenant management process space 572 and system process space 574. It will be understood that process space 570 is an abstraction to illustrate the resources allocated for execution of processes (e.g., programs or applications) within application server 550. The skilled reader recognizes that memory and processor and other hardware resources may need to be allocated, as well as software resources to support the execution of a process. The processes may be executed as separate threads, or may share a thread. In one embodiment, the number N of tenant processes is equal to a number of subscriber tenants. In another embodiment, the number N of tenant processes may be higher than the number of subscriber tenants. Tenant management process 572 provides management of the other processes, including determining when certain processes execute. System process 574 executes operations related to functions of MTS 540.

Each application server 550 may be configured to tenant data storage in database instance 580 and the tenant data stored therein, and to system data storage of system database 542 and the system data stored therein to serve requests of user devices. As mentioned above, in one embodiment, tenant data is separated logically, and stored in the same multitenant database. In one embodiment, database instance 580 stores data in tables 582-0 through 582-M, where M is some integer number of tables. In one embodiment, different tables store data of different types. Application metadata 586 may be implemented as a separate table. Alternatively, one of the tables 582-0 through 582-M could be a table that stores varying types of objects, which are defined through metadata stored in the table.

In one embodiment, database instance is further implemented with user storage space distinct (e.g., identifiable) from its associated tenant. Thus, for example, user data may include the tenant ID, as well as an identifier specific to a user. Thus, storage 584 may represent either or both of tenant storage or user storage. For example, a copy of a user's most recently used (MRU) items might be stored to in user storage within database instance 580. Similarly, a copy of MRU items for an entire organization that is a tenant might be stored to a tenant storage area of database instance 580. In one embodiment, the tenant data and the system data (as illustrated by system database 542) are stored in separate databases.

Application servers 550 may be communicably coupled to database systems, e.g., having access to system database 542 and tenant database instance 580, via a different network connection. For example, one application server may be coupled via a network (e.g., the Internet), another application server might be coupled via a direct network link, and another application server might be coupled by yet a different network connection. The application servers may connect to the database systems via TCP/IP or another transport protocol, at least partially depending on the network interconnect used.

Regarding storage in database instance 580, one tenant might be a company that employs a sales force where each salesperson uses MTS 540 to manage their sales process. Thus, a user might maintain contact data, leads data, customer follow-up data, performance data, goals and progress data, and other data, all applicable to that user's personal sales process (e.g., storage 584, which may be tenant storage). Thus, all of the data and the applications to access, view, modify, report, transmit, calculate, or perform other operations can be maintained and accessed via a user device having nothing more than network access. In an example of an MTS arrangement, the user can manage his or her sales efforts and cycles from any of many different user devices. For example, if a salesperson is visiting a customer and the customer has a lobby with Internet access, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 540 that are allocated at the tenant level while other data structures might be managed at the user level. Because MTS 540 may support multiple tenants including possible competitors, MTS 540 should have security protocols that keep data, applications, and application use separate. Additionally, because many tenants may opt for access to an MTS rather than maintain their own system, redundancy, up-time, and backup are additional functions that may be implemented in MTS 540. In addition to user-specific data and tenant specific data, MTS 540 may also maintain system level data usable by multiple tenants or other data. Such system level data might include industry reports, news, postings, and the like that are sharable among tenants.

In one embodiment, each database instance 580 can be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object type" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, or other information. Another table might describe a purchase order, including fields for information such as customer, product, sale price, date, or other fields. In one embodiment, a multitenant database has standard entity tables for use by all tenants. For CRM database applications, such standard entities might include tables for Account, Contact, Lead, and Opportunity data, each containing pre-defined fields. Thus, tables 582-0 through 582-M may include standard, defined tables.

In one embodiment, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", teaches systems and methods for creating custom objects as well as customizing standard objects in a multitenant database system. In one embodiment, for example, all custom entity data rows are stored in a single multitenant physical table, which may contain multiple logical tables per organization. It is transparent to customers that their multiple "tables" are in fact stored in one large table or that their data may be stored in the same table as the data of other customers.

Figure 6:
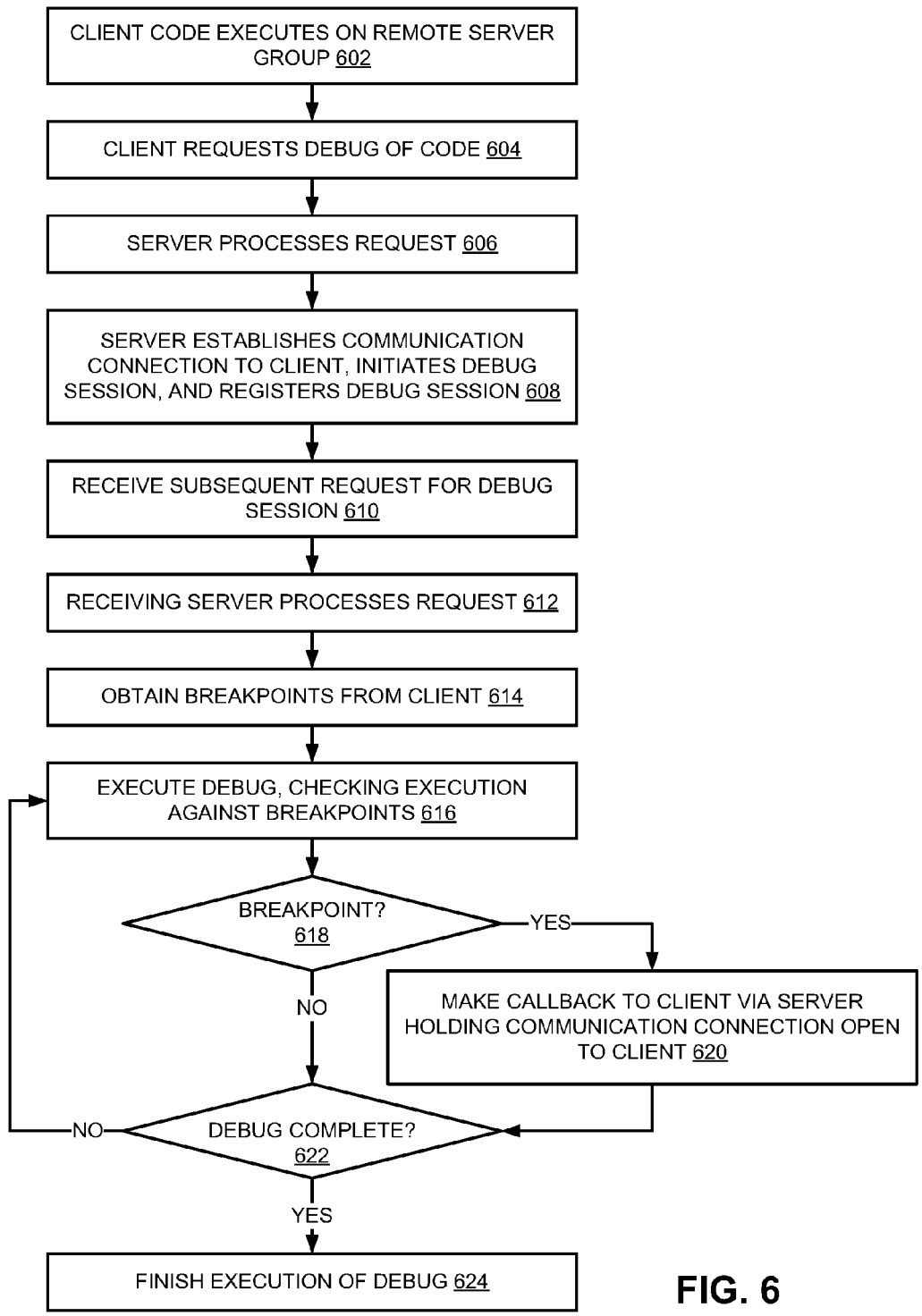
FIG. 6 represents a flow diagram of an embodiment of remote debugging in a server group environment.

FIG. 6 represents a flow diagram of an embodiment of remote debugging in a server group environment. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments of the invention; thus, not all actions are required in every implementation. Other process flows are possible.

Client code is executed on a server group remote from the client that owns the client code, 602. The client requests debug of the client code, 604. A server from the server group processes the request, 606. In one embodiment, the same server that identifies the request as a debug request will then perform debug session initiation operations. In another embodiment, a request identified as being for debug is passed to another server of the group that is designated to handle such requests.

Thus, whether the server that processed the request and identified it as a debug request, or another server, establishes a communication connection to the client, initiates a debug session, and registers the debug session, 608. The server that establishes the communication connection maintains the connection, or is part of a selected or designated subgroup of server that maintains the connection. It will be understood that flexibility in having a subgroup of servers to handle such communication connections also results in added overhead to manage and allocate responsibility among the subgroup.

At some point in the future after the debug session is established, the server group receives a subsequent request related to the debug session, 610. In one embodiment, the request is processed on whichever server is running and receives the request, 612. The processing server will connect back to a server that maintains the communication connection with the client, which may be referred to as a "hold open" server.

When the hold-open server establishes the communication connection, in one embodiment, it request breakpoints from the IDE client, which can be sent back to the processing server. Thus, the processing server obtains debug breakpoints from the client, 614, via the hold-open server. The processing server executes the debug, which checks against the list of breakpoints upon executing the debug code, 616, for example, by checking the breakpoints against every Apex statement to run.

If a breakpoint is hit, 618, the processing server makes a callback to the client via the hold-open server, 620. Thus, communication back to the client related to the debug execution can be via a two-hop connection (e.g., from the processing server to the hold-open server to the client). In one embodiment, the first connection from the hold-open server is a normal socket connection, and the second connection from the processing server is a proxied socket over a Comet HTTP connection. With such a two-hop connection, any particular server can process any request without overloading a particular server.

If a breakpoint was not reached, 618, or after the callback is made, 620, the processing server continues to execute the debug, for as long as it is not complete. If the debug is not complete, 622, the execution and checking for breakpoints continues, 616. If the debug is complete, 622, the execution is concluded, 624.

In alternate embodiments, one or more of the above details may be changed regarding how different servers receive and process requests, and how communication is made back to the client. More particularly, in one embodiment, the receiving server of the group determines if it should execute the request or whether the request should be sent to another server for execution. In one embodiment, the receiving server simply executes the request, and the receiving/processing server determines what server maintains a connection back to the client. However, if the receiving server determines that it should not execute the request, it sends the request to another server for execution.

If it determines that it should execute the request or if the system is configured for the receiving server to execute requests received, it executes the request. Whichever server executes the request, it determines if it or another server of the server group maintains the communication connection to the client. If the executing server maintains the connection and not another server, it communicates with the client over the communication connection. If another server of the group maintains the connection, the processing server sends the communication to the other server that maintains the connection, which then communicates with the client.

Thus, in alternate embodiments, one or more server functions may be centralized with different servers (e.g., one server processes debug requests, one server executes debug routines, or some other function). The potential downside to such an implementation is that one server may end up with a work load that is not distributed among a group.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A system comprising:
  a server group including multiple hardware servers each having at least a memory device and one or more hardware processing devices coupled with the at least one memory device that share tasks among the multiple hardware servers, the server group to
  receive a debugging session request from a client device over a network connection, the debugging session request to debug code executed by the server group and not locally at the client device;
  establish a connection to the client device to initiate a debugging session between the server group and an integrated development environment (IDE) of the client device in response to the debugging session request;
  maintain open the connection with the client device for a duration of the debugging session;
  maintain state for the debugging session with a resource shared among the server for subsequent service requests of the debugging session at the server group;
  receive service requests with the first server and distribute the service requests among the server group for processing, wherein each server that processes a request is to communicate via the connection to the client device about processing on the service requests and wherein breakpoint operations are modified to be registered in a same state as the connection.

2. The system of claim 1, wherein the server group further comprises a multitenant database shared by a plurality of separate and distinct customer organizations,
  wherein the multitenant database stores data for multiple client organizations each identified by a tenant identifier (ID) and one or more users are associated with the tenant ID,
  wherein the one or more users of each client organization accesses data identified by the tenant ID associated with the respective client organization, and
  wherein the multitenant database is hosted by an entity separate from the client organization.

3. The system of claim 1, wherein the server group is to establish the connection by initiating a communication thread for communication from a first server to the client device, the communication thread to be maintained for the duration of the debugging session.

4. The system of claim 1, wherein the server group is to maintain state for the debugging session by storing state for the debugging session in a shared memory cache shared among the servers of the server group.

5. The system of claim 1, wherein the server group is to further
  set a breakpoint that interrupts only execution of a thread of a server handling execution of the debugging session, and does not interrupt other execution threads in the server group;
  wherein the breakpoint is set with an associated timeout, and execution of the thread is resumed and ended if activity on the thread ceases for the length of the timeout.

6. The system of claim 1, wherein the server group is to maintain state for the debugging session by creating a thread associated with the debugging session and a stack associated with the thread, wherein the servers of the server group have access to the thread and the stack.

7. A method comprising:
  receiving a debugging session request at a server group from a client device over a network connection, the server group appearing to the client device as a single server entity associated with a database, the server group including multiple servers that share tasks among the multiple servers based on workload sharing, the debugging session request to debug code executed by the server group and not locally at the client device;

establishing a connection to the client device to initiate a debugging session between the server group and an integrated development environment (IDE) of the client device in response to the debugging session request, the server group to maintain open the connection with the client device for a duration of the debugging session;

maintaining state for the debugging session for subsequent service requests of the debugging session at the server group with a resource shared among the server group;

distributing the subsequent service requests among the server group for processing, wherein each server that processes a request is to communicate via the connection to the client device about processing on the service requests and wherein breakpoint operations are modified to be registered in a same state as the connection.

8. The method of claim 7, wherein the code executed by the server group comprises an application on data stored at the server group for the client device.

9. The method of claim 7, wherein the database comprises a multitenant database and the server group provides processing services for access to the multitenant database, wherein the multitenant database stores data for multiple client organizations each identified by a tenant identifier (ID) and one or more users are associated with the tenant ID, the client device being one of the users associated with the tenant ID, wherein the one or more users of each client organization accesses data identified by the tenant ID associated with the respective client organization, and wherein the multitenant database is hosted by an entity separate from the client organization.

10. The method of claim 7, wherein establishing the connection further comprises:

initiating a communication thread for communication from the server group to the client device, the communication thread to be maintained for the duration of the debugging session.

11. The method of claim 7, wherein registering the debugging session for the client device further comprises:

generating an identifier (ID) for the debugging session; and associating the ID with a first server, wherein a second server of the server group directs communication related to the debugging session to the first server based on the associated ID.

12. The method of claim 7, wherein maintaining state for the debugging session further comprises:

storing state for the debugging session in a shared memory cache shared among the servers of the server group.

13. The method of claim 7, wherein maintaining state for the debugging session further comprises:

initiating a debugging thread with an associated stack for the debugging session, the debugging thread to be maintained for the duration of the debugging session.

14. The method of claim 7, further comprising:

starting a new processing thread for each subsequent service request, and closing each processing thread upon servicing its corresponding request.

15. The method of claim 7, further comprising:

setting a breakpoint that interrupts only execution of a thread of a server handling execution of the debugging session, and does not interrupt other execution threads in the server group;

wherein setting the breakpoint includes setting an associated timeout, and execution of the thread is resumed and ended if activity on the thread ceases for the length of the timeout.

16. The method of claim 7, wherein maintaining state comprises storing state information in the associated stack.

17. A non-transitory computer readable storage medium having content stored thereon, which when executed, cause a machine to perform operations including:

receiving a debugging session request at a server group from a client device over a network connection, the server group appearing to the client device as a single server entity associated with a database, the server group including multiple servers that share tasks among the multiple servers based on workload sharing, the debugging session request to debug code executed by the server group and not locally at the client device;

establishing a connection to the client device to initiate a debugging session between the server group and an integrated development environment (IDE) of the client device in response to the debugging session request, the server group to maintain open the connection with the client device for a duration of the debugging session;

maintaining state for the debugging session for subsequent service requests of the debugging session at the server group with a resource shared among the server group;

distributing the subsequent service requests among the server group for processing, wherein each server that processes a request is to communicate via the connection to the client device about processing on the service requests and wherein breakpoint operations are modified to be registered in a same state as the connection.

18. The non-transitory computer readable storage medium of claim 17, wherein maintaining state for the debugging session further comprises:

storing state for the debugging session in a shared memory cache shared among the servers of the server group.

19. The non-transitory computer readable storage medium of claim 17, wherein maintaining state for the debugging session further comprises:

initiating a debugging thread with an associated stack for the debugging session, the debugging thread to be maintained for the duration of the debugging session; and storing the state information in the associated stack.

* * * * *